(12) United States Patent
Guo

(10) Patent No.: US 11,372,319 B2
(45) Date of Patent: Jun. 28, 2022

(54) LCD PROJECTOR WITH ACTIVE COLOR SEPARATION LIGHTING

(71) Applicant: NANHUA INTELLIGENT PRECISION MACHINE (SHENZHEN) CO., LTD., Guangdong (CN)

(72) Inventor: Hanwen Guo, Guangdong (CN)

(73) Assignee: NANHUA INTELLIGENT PRECISION MACHINE (SHENZHEN) CO., LTD., Guangdong (CN)

( * ) Notice: Subject to any disclaimer, the term of this patent is extended or adjusted under 35 U.S.C. 154(b) by 0 days.

(21) Appl. No.: 17/139,565

(22) Filed: Dec. 31, 2020

(65) Prior Publication Data
US 2021/0124242 A1    Apr. 29, 2021

(30) Foreign Application Priority Data
Oct. 19, 2020    (CN) .......................... 202011120894.X

(51) Int. Cl.
*G03B 21/00*    (2006.01)
*G03B 21/20*    (2006.01)

(52) U.S. Cl.
CPC ......... *G03B 21/006* (2013.01); *G03B 21/008* (2013.01); *G03B 21/2033* (2013.01)

(58) Field of Classification Search
CPC .... G03B 21/006; G03B 21/008; G03B 21/28; G03B 21/145; G03B 21/2013; G03B 21/2033; G02B 6/0036; G02B 6/0056; G02B 6/0076; G02F 1/1316; G02F 1/1333; G02F 1/133302; G02F 1/133504; G02F 1/133615; G02F 1/133626; H04N 9/315; H04N 9/3105; H04N 9/3108; H04N 9/3114; H04N 9/3161; H04N 9/3173

See application file for complete search history.

(56) References Cited

U.S. PATENT DOCUMENTS

| | | | |
|---|---|---|---|
| 2011/0063542 A1* | 3/2011 | Park ..................... | G02B 6/0036 349/62 |
| 2011/0141399 A1* | 6/2011 | Kim ..................... | G02F 1/13362 349/64 |
| 2016/0131931 A1* | 5/2016 | Furutani ........... | G02F 1/133502 349/12 |
| 2020/0081564 A1* | 3/2020 | Lee ......................... | G06F 3/041 |

* cited by examiner

*Primary Examiner* — Sultan Chowdhury

(57) ABSTRACT

A liquid crystal display (LCD) projector with active color separation lighting includes a projection light source, a condenser, a collimating lens, an incident polarizer, a dichroic mirror, an LCD light valve, a color combination mirror, an outgoing polarizer, a field lens and a projection lens all of which are distributed in sequence according to a direction of light travel. In the present invention, RGB three primary color rays of the projection light source are irradiated on the RR, GR and BR of the LCD light valve, respectively, ≥⅔ of the light originally blocked by the CF and the light originally blocked by the BM pass as much as possible or even completely through R, G and B sub-pixels, which fundamentally improves the transmittance of the LCD light valve, so that the efficiency of the optical system is completely improved.

8 Claims, 4 Drawing Sheets

LCD PROJECTOR WITH ACTIVE COLOR SEPARATION LIGHTING

CROSS REFERENCE OF RELATED APPLICATION

The present invention claims priority under 35 U.S.C. 119(a-d) to CN 202011120894.X, filed Oct. 19, 2020.

BACKGROUND OF THE PRESENT INVENTION

Field of Invention

The present invention relates to the field of projector, and more particularly to a liquid crystal display (LCD) projector with active color separation lighting.

Description of Related Arts

The traditional transmissive, the light valve of full-color liquid crystal display (LCD) projector, in terms of optics, includes a color filter (CF), a black matrix (BM), multiple thin film transistors (TFTs), two glass substrates and the liquid crystal sandwiched between the two glass substrates. Among them, the CF includes a red color filter array, a green color filter array and a blue color filter array; the CF and BM are commonly fabricated on one of the two glass substrates, and the TFTs are fabricated on another of the two glass substrates; the red color filter array, the green color filter array and the blue color filter array of the CF, the light transmission window array of the BM, and red (R), green (G) and blue (B) sub-pixel arrays of the TFTs are corresponding to each other; generally, each pixel of the TFTs includes a R sub-pixel, a G sub-pixel and a B sub-pixel.

For the light valve of a single LCD projector, due to engineering characteristics of CF, BM, TFT and other materials, the transmission efficiency of CF is about 30%, the aperture ratio of light transmission window of BM is about in a range of 40% to 70%, and the transmission efficiency of TFT is generally only in a range of 40% to 70%; after taking into account the incident and outgoing polarizer efficiencies of light valve of single LCD projector, the total transmittance of light valve to natural light is only about in a range of 4% to 7%.

As a result, the total efficiency of optical system of single LCD projector is usually no more than 3.5%. According to the luminous efficiency of white light LED of current high color temperature COB (chip on board) is about 100 Lm/W, consuming 100 W of power, the single LCD projector can only output 350 Lm of luminous flux. However, the DLP projector and the 3LCD projector consume the same power and can output 2500-4000 Lm of luminous flux. Obviously, the gap, between the single LCD projector and the DLP and 3LCD projectors, is almost an order of magnitude.

At the same time, the LCD light valve has the extremely low transmittance, which means that most of the illuminating light is absorbed by the CF, BM and TFT, and then is converted into Joule heat. As a result, it is extremely difficult for the LCD light valve to dissipate heat for the desire to output higher brightness. For example, when the projector is designed to output 1000 Lm of luminous flux, there are tens of watts of optical power to heat a light valve with a smaller size (such as 4 inches), and the thermal conductivity of glass substrates of light valve is extremely low, so that the heat of the liquid crystal and TFT cannot be quickly conducted to the outer surface of glass substrates and is taken away by means of air cooling, and the screen will be black after a few seconds after booting. Therefore, multiple restrictions such as energy consumption, heat dissipation, and output brightness fundamentally limit the performances and applications of the single LCD projector.

Referring to FIGS. 6 and 7, in order to solve the problems of low efficiency such as CF, BM and TFT, the active color separation technology of the past single LCD projector directly cancels the CF of the light valve, uses three planar beam splitters RL, GL and BL (which are configured to reflect separately red light, green light and blue light), combines with the hexagonal lens array Lns, and then the RGB light rays separated by the RL, GL and BL are irradiated to corresponding RGB sub-pixels, respectively through the three planar beam splitters and Lns on the LCD light valve 6', thereby realizing the application to improve the efficiency of BM and TFT as much as possible. Although this technology can achieve higher transmission efficiency, the disadvantages are also very obvious. Firstly, even without considering the selection loss of the splitting wavelength, the total efficiency of five light transmission surfaces of the three planar beam splitters is not high, generally ≤78% (about the eighth power of 0.97). Secondly, in the process of splitting white light WL to RGB three primary colors, it is difficult to divide the wavelength thoroughly, which greatly reduces the efficiency of Lns, especially when there is a synchronization difference between the thermal expansion and contraction of Lns and LCD light valve 6', the images will appear RGB cross colors, seriously affecting viewing. Thirdly, The RGB primary colors separated by the RL, GL and BL have a large difference in optical path, which increases the difficulty of design and production to reduce the color separation focusing aberration and distortion of Lns; and at the same time, after the white light WL with extremely high collimation passes through the three beam splitters, not only the aperture angle becomes larger, but the irradiation area is also enlarged, so that the optical extension is further increased, which limits the light spread of the light source, and further restricts the luminous flux and utilization of the light source. Fourthly, since there is no CF that must take into account the risk of cross-color, the aperture ratio of the LCD light valve 6' is very low, generally ≤40%. In general, only when the PPI (pixels per inch, namely, pixel density) of the LCD light valve is about ≤120, it is easy to realize and has realizing value. Therefore, it is completely unable to meet the basic requirements of at least 300-900 PPI for the single LCD projector in recent years.

In recent years, with the introduction and breakthrough of large-area melting, etching, collision, precision molding and other technical processes in the domestic optical manufacturing industry chain, as well as some technical solutions for low refractive index viscose, essential innovations and breakthroughs in LCD light valves have become entirely possible and necessary.

SUMMARY OF THE PRESENT INVENTION

In order to solve the above technical problems, an object of the present invention is to provide a liquid crystal display (LCD) projector with active color separation lighting, which has the effect of realizing the original design intention, does not increase the cost too much, has a very high cost performance, and brings a fundamental change in performance and applications.

The present invention provides a liquid crystal display (LCD) projector with active color separation lighting, which comprises a projection light source, a condenser, a collimating lens, an incident polarizer, a dichroic mirror, an LCD light valve, a color combination mirror, an outgoing polarizer, a field lens and a projection lens all of which are distributed in sequence according to a direction of light travel.

Preferably, the LCD light valve, having a full-color transmissive structure, comprises an incident glass, a liquid crystal layer and an outgoing glass; a color filter (CF) and a black matrix (BM) are provided on the incident glass, multiple thin film transistors (TFTs) are provided on the outgoing glass; the CF comprises a red color filter array comprising multiple red-color (R-color) resistors, a green color filter array comprising multiple green-color (G-color) resistors and a blue color filter array comprising multiple blue-color (B-color) resistors; the R-color resistors are located between the G-color resistors and the B-color resistors; the red color filter array, the green color filter array and the blue color filter array of the CF, a light transmission window array of the BM, and light transmission window arrays of R, G and B pixels of the TFTs are corresponding to each other; a perpendicular bisector of a set of parallel edges of a light transmission surface of the LCD light valve is defined as x-axis, a perpendicular bisector of another set of parallel edges of the light transmission surface of the LCD light valve is defined as y-axis, an intersection of the x-axis and the y-axis is an optical center of the LCD light valve, an optical axis passing through the optical center and perpendicular to an xy plane is defined as z-axis.

Preferably, the projection light source is a three-base color light emitting diode (LED) light source which comprises a R-chipset, a G-chipset and a B-chipset; each of the R-chipset, the G-chipset and the B-chipset comprises one or more columns of chips.

The G-chipset and the B-chipset are provided at two sides of the R-chipset of the projection light source, respectively.

The projection light source and the LCD light valve have a same xyz coordinate system and a coincident z-axis; looking from looking from an outgoing surface of the collimating lens to the projection light source, an order of the G-chipset, the R-chipset and the B-chipset is opposite to an order of the G-color resistors, the R-color resistors and the B-color resistors of the LCD light valve.

Preferably, the projection light source is a white LED light source or laser-mixed white light source, the projector with active color separation lighting further comprises a grating provided between the incident polarizer and the dichroic mirror.

Preferably, the dichroic mirror is a cylindrical lens array group which comprises multiple sub-cylindrical lenses; a quantity of the sub-cylindrical lenses in the cylindrical lens array group is equal to a column number of the pixels in the LCD light valve, and pixels per column of the LCD light valve are corresponding to a column of the sub-cylindrical lenses, respectively; a central axis of each column of the sub-cylindrical lenses is corresponding to a central line of a light transmission window of each column of the black matrix corresponding to the R-color resistors; the cylindrical lens array group is attached to the incident surface of the LCD light valve; each column of the sub-cylindrical lenses are single-sided sub-cylindrical lenses or double-sided sub-cylindrical lenses.

Preferably, the dichroic mirror is a lens array which comprises multiple sub-lenses, a quantity of rows and columns of the lens array are respectively equal to a quantity of rows and columns of the pixels of the LCD light valve; a center of each sub-lens of the lens array is corresponding to a center of each light transmission window of the black matrix corresponding to each R-color resistor; the lens array is attached to the incident surface of the LCD light valve.

Preferably, the color combination mirror is a cylindrical lens array group which comprises multiple sub-cylindrical lenses; a quantity of the sub-cylindrical lenses in the cylindrical lens array group is equal to a column number of the pixels in the LCD light valve, and pixels per column of the LCD light valve are corresponding to a column of the sub-cylindrical lenses, respectively; a central axis of each column of the sub-cylindrical lenses is corresponding to a central line of a light transmission window of each column of the black matrix corresponding to the R-color resistors; the cylindrical lens array group is attached to an outgoing surface of the LCD light valve; each column of the sub-cylindrical lenses are single-sided sub-cylindrical lenses or double-sided sub-cylindrical lenses.

Preferably, the color combination mirror is a lens array which comprises multiple sub-lenses, a quantity of rows and columns of the lens array are respectively equal to a quantity of rows and columns of the pixels of the LCD light valve; a center of each sub-lens of the lens array is corresponding to a center of each light transmission window of the black matrix corresponding to each R-color resistor; the lens array is attached to the outgoing surface of the LCD light valve.

Preferably, the condenser is any one of a single lens with freeform surface, a lens combination, a square cone condenser or a CPC (compound parabolic) condenser.

Preferably, the collimating lens is any one of Fresnel lens, plano-convex lens, biconvex lens and meniscus lens, or any combination of Fresnel lens, plano-convex lens, biconvex lens and meniscus lens.

Preferably, the grating is a blazed grating or volume grating.

Beneficial effects of the present invention are as follows.

In the present invention, RGB three primary color rays of the projection light source are irradiated on the red-color resistor, green-color resistor and blue-color resistor of the LCD light valve, respectively, $\geq 2/3$ of the light originally blocked by the CF and the light originally blocked by the BM pass as much as possible or even completely through R, G and B sub-pixels, which fundamentally improves the transmittance of the LCD light valve, increases the total efficiency of CF and BM of the LCD light valve from 12%-21% to more than 60%-80%, and increases the efficiency of TFT from 40%-70% to 60%-80%, so that the efficiency of the optical system is completely improved, the heat absorption of the LCD light valve is completely decreased, thus the output brightness is improved by an order of magnitude and the energy consumption of the projector is greatly reduced. At the same time, the present invention is also fundamentally helpful to improve the color gamut range and white balance of projected images. In generally, the present invention is a meaningful innovation progress and technological breakthrough for improving the inherent performance and application limitations of the single LCD projector.

BRIEF DESCRIPTION OF THE DRAWINGS

In order to more clearly illustrate technical solutions of embodiments of the present invention or technical solutions of the prior art, the drawings used in the embodiments of the present invention or the prior art will be briefly described as below. It should be understood that the following drawings show only certain embodiments of the present invention and are therefore not considered as limiting the protective scope of the present invention. For those skilled in the art, other relevant drawings can also be obtained according to these drawings without any creative work.

Figure 1:
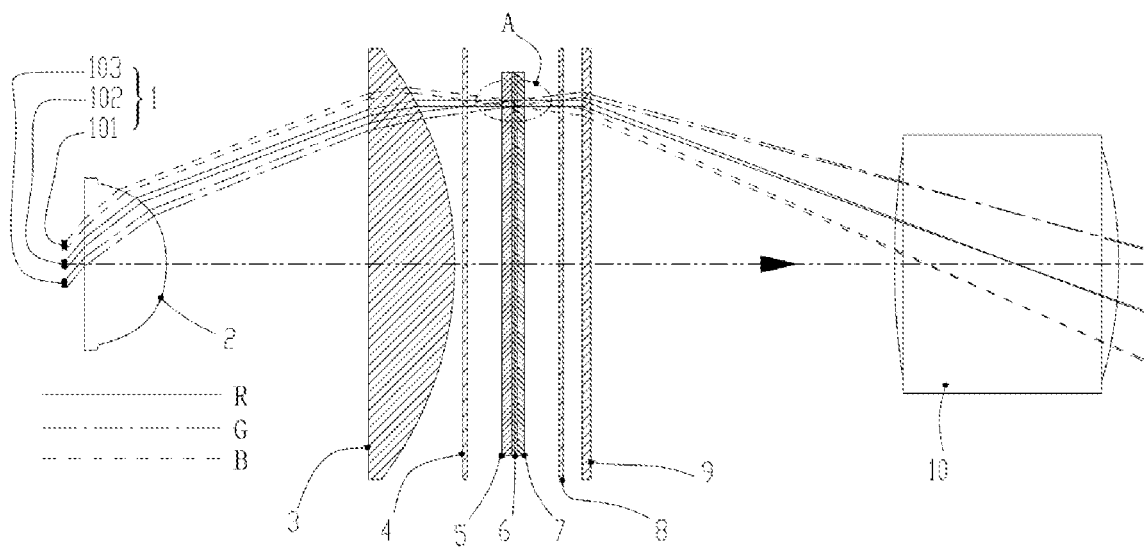
FIG. 1 is a structurally schematic view of a liquid crystal display (LCD) projector with active color separation lighting according to the first preferred embodiment of the present invention.

In the drawings, 1: projection light source; 101: B-chipset; 102: R-chipset; 103: G-chipset; 2: condenser; 3: collimating lens; 4: incident polarizer; 5: dichroic mirror; 6: LCD light valve; 61: incident glass; 611: color filter (CF); 6111: G-color resistor; 6112: R-color resistor; 6113: B-color resistor; 612: black matrix (BM); 62: liquid crystal layer; 63: outgoing glass; 631: thin film transistor (TFT); 7: color combination mirror; 8: outgoing polarizer; 9: field lens; 10: projection lens; 11: grating, wherein R denotes red, G denotes green, B denotes blue and W denotes white.

DETAILED DESCRIPTION OF THE PREFERRED EMBODIMENT

In order to enable those skilled in the art to better understand technical solutions of the present invention, the present invention will be further described in detail with accompanying drawings as follows. It should be understood that the specific embodiments described herein are merely illustrative of the present invention and are not intended to limit the present invention.

It should be noted that similar reference numerals and letters indicate similar elements in the following drawings. Therefore, once an element is defined in one figure, it does not need to be further defined and explained in subsequent figures.

It should be noted that the terms "center", "upper", "lower", "left", "right", "vertical", "horizontal", "inner", "outer", etc. indicate the orientation or positional relationship based on the orientation or position relationship shown in the drawings, or the orientation or position relationship that the product of the present invention is usually placed in use, which is only for the convenience of describing the present invention and simplifying the description, rather than indicating or implying that the device or element referred to must have a specific orientation, be constructed and operated in a specific orientation, and therefore cannot be understood as a limitation to the present invention. In addition, the terms "first", "second", "third", etc. are only used for distinguishing description, and cannot be understood as indicating or implying relative importance.

In addition, the terms "horizontal", "vertical", "overhanging" and other terms do not mean that the component is required to be absolutely horizontal or overhanging, but may be slightly inclined. For example, "horizontal" only means that its direction is more horizontal than "vertical", and it does not mean that the structure must be completely horizontal, but can be slightly inclined.

In the description of the present invention, it should also be noted that the terms "provided", "installed", "connected", and "connection" should be interpreted broadly, unless otherwise clearly specified and limited. For example, the connection can be a fixed connection, a detachable connection or an integral connection; it can be a mechanical connection or an electrical connection; it can be a direct connection or an indirect connection through an intermediate medium, and it can be the internal communication between two components. For those skilled in the art, the specific meanings of the above-mentioned terms in the present invention can be understood in specific situations.

First Embodiment

Figure 2:
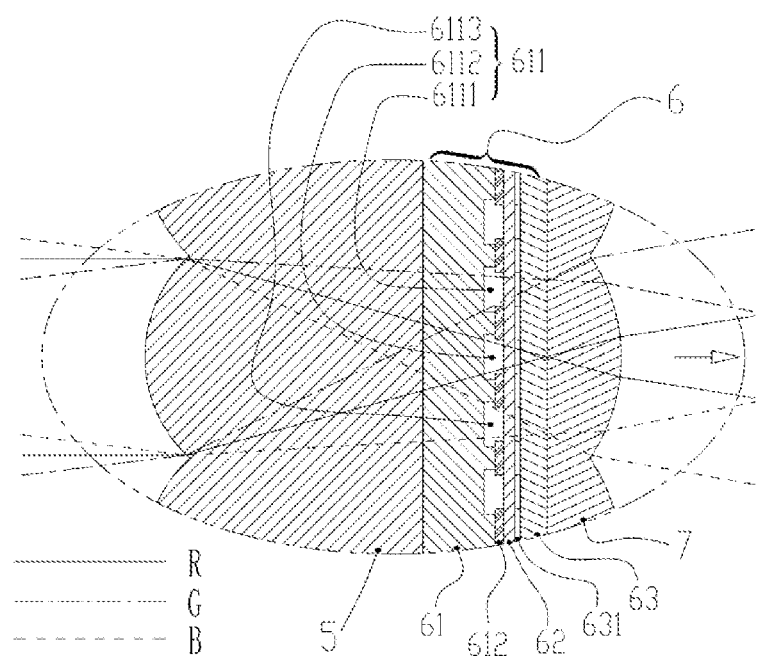
FIG. 2 is a partially enlarged view of A in FIGS. 1 and 4.
Figure 3:
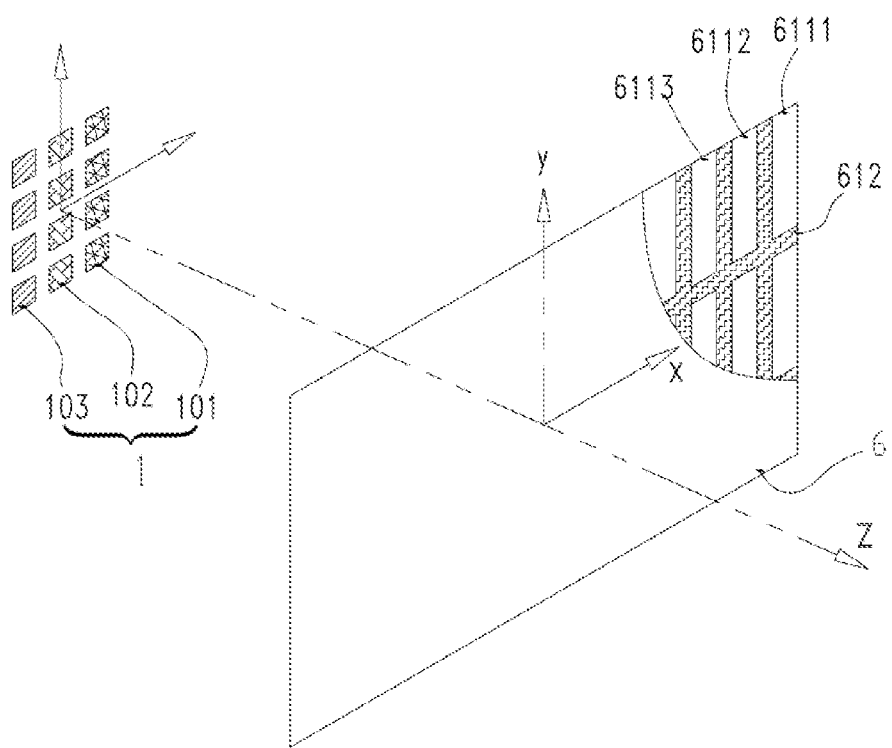
FIG. 3 shows a corresponding relationship between an order of a B-chipset, a R-chipset and a G-chipset of a projection light source and an order of a G-color resistor, a R-color resistor and a B-color resistor of an LCD light valve of the LCD projector.

As shown in FIGS. 1 to 3, a liquid crystal display (LCD) projector with active color separation lighting according to a first preferred embodiment of the present invention is illustrated, which comprises a projection light source 1, a condenser 2, a collimating lens 3, an incident polarizer 4, a dichroic mirror 5, an LCD light valve 6, a color combination mirror 7, an outgoing polarizer 8, a field lens 9 and a projection lens 10 all of which are distributed in sequence according to a direction of light travel.

The LCD light valve 6 comprises an incident glass 61, a liquid crystal layer 62 and an outgoing glass 63; a color filter (CF) 611 and a black matrix 612 are provided on the incident glass 61, multiple thin film transistors 631 are provided on the outgoing glass 63 in an array manner.

According to the first embodiment of the present invention, the projection light source 1 is embodied as a three-base color light emitting diode (LED) light source which comprises a R-chipset 102, a G-chipset 103 and a B-chipset 101. Referring to FIG. 3, it is able to be seen that after the three-base color LED light source and the LCD light valve 6 define a consistent xyz coordinate system, an order of the G-chipset 103, the R-chipset 102 and the B-chipset 101 along an x+ axis in sequence is opposite to an order of B, R and G sub-pixels along the x+ axis in sequence.

Referring to FIG. 2, the dichroic mirror 5 and the color combination mirror 7 are embodied as a cylindrical lens array group which comprises multiple sub-cylindrical lenses, each of the sub-cylindrical lenses has a plano-convex structure, the sub-cylindrical lenses of the dichroic mirror 5 and the sub-cylindrical lenses of the color combination mirror 7 are attached to an incident surface and an outgoing surface of the LCD light valve 6, respectively. A quantity of the sub-cylindrical lenses of the cylindrical lens array group embodied by the dichroic mirror 5, and a quantity of the sub-cylindrical lenses of the cylindrical lens array group embodied by the color combination mirror 7 are both equal to the column number of pixels in the LCD light valve 6. Pixels per column are corresponding to a column of the sub-cylindrical lenses of the dichroic mirror 5 and a column of the sub-cylindrical lenses of the color combination mirror 7. A central axis of each column of the sub-cylindrical lenses of the dichroic mirror 5 and a central axis of each column of the sub-cylindrical lenses of the color combination mirror 7 are corresponding to a central line of a light transmission window of each column of the black matrix 612 corresponding to a R-color resistor 6112.

Referring to FIGS. 1 to 3, the R-chipset 102, the G-chipset 103 and the B-chipset 101 of the projection light source 1 are not spatially coincident; and looking from the collimating lens 3 to the projection light source 1, the order of the G-chipset 103, the R-chipset 102 and the B-chipset 101 is opposite to the order of the B, R and G sub-pixels of the LCD light valve 6; and therefore, the RGB three primary color rays of the projection light source 1 are irradiated on the dichroic mirror 5 at different angles, the R-rays are condensed by one of the sub-cylindrical lenses of the dichroic mirror 5 to irradiate a column of the R-color resistors 6112 of the LCD light valve 6, without irradiating a column of the G-color resistors 6111 or a column of the B-color resistors 6113 of the LCD light valve 6 both of which are located at two sides of the column of the R-color resistors 6112, respectively. Similarly, the G-rays are condensed by another of the sub-cylindrical lenses of the dichroic mirror 5 to irradiate the column of the G-color resistors 6111 of the LCD light valve 6, without irradiating the column of the R-color resistors 6112 or the column of the B-color resistors 6113 of the LCD light valve 6. The B-rays are condensed by another of the sub-cylindrical lenses of the dichroic mirror 5 to irradiate the column of the B-color resistors 6113 of the LCD light valve 6, without irradiating the column of the R-color resistors 6112 or the column of the G-color resistors 6111 of the LCD light valve 6.

As a result, about ⅔ of the illuminating rays blocked by the CF of the LCD light valve 6 no longer exists (wherein relatively to the ⅔ of the illuminating rays blocked by the CF, the absorption of red light by the red color filter array comprising multiple red-color (R-color) resistors, the absorption of green light by the green color filter array comprising multiple green-color (G-color) resistors, and the absorption of blue light by the blue color filter array comprising multiple blue-color (B-color) resistors can be ignored), the corresponding blocking of BM to the illuminating rays is also halved (wherein if the dichroic mirror 5 is embodied as an array mirror, the "halved" blocking can be all eliminated), thus completely promoting the transmittance of the LCD light valve.

The condenser 2 and the collimating lens 3 are embodied as a plano-convex lens with a freeform surface.

Referring to FIG. 3, the projection light source 1 comprises the R-chipset 102, the G-chipset 103 and the B-chipset 101. Each of the R-chipset 102, the G-chipset 103 and the B-chipset 101 comprises 4 wafers connected with each other in series. Each of the wafers has a size of 1.2 mm×1.5 mm. The R-chipset 102, the G-chipset 103 and the B-chipset 101 are separately driven for adjusting the luminous flux of the R-rays, G-rays and B-rays, respectively, so that the images of the projector get perfect white balance. A total optical extension of the 12 wafers is about 21π, a main peak of a wavelength of the R-rays, G-rays and B-rays is 630 nm, 530 nm and 445 nm, a ratio of luminous fluxes of the R-rays, G-rays and B-rays is 0.3:1:0.12, the luminous flux outputted by the projection light source 1 is about 7000 Lm (a total power of the projection light source 1 is about 80 W).

The LCD light valve 6 is embodied as an HD (high definition) light valve with a size of 4.46 inches, a color gamut of 45% and a natural light transmittance of 5.52%.

On the incident surface of the dichroic mirror 5, the Fno (f-number) of the light is about 8. After the light passing through the color combination mirror 7, the Fno is about 3.06. For the projection lens 10 of this embodiment, it is very simple and inexpensive. The total efficiency of the condenser 2 and the collimating lens 3 is about 75%, the total efficiency of the incident polarizer 4 and the outgoing polarizer 8 is about 42%, and the efficiency of the field lens 9 is about 92%. The projector of this embodiment can output full 1000 Lm of the luminous flux, which is impossible with traditional single LCD projectors. At the same time, the color gamut of images of projector is expanded to more than 75%-80%. By fine-tuning the current of the R-chipset, G-chipset and B-chipset of the projection light source 1, the nearly perfect white balance of the images of projector can be obtained.

Second Embodiment

Figure 4:
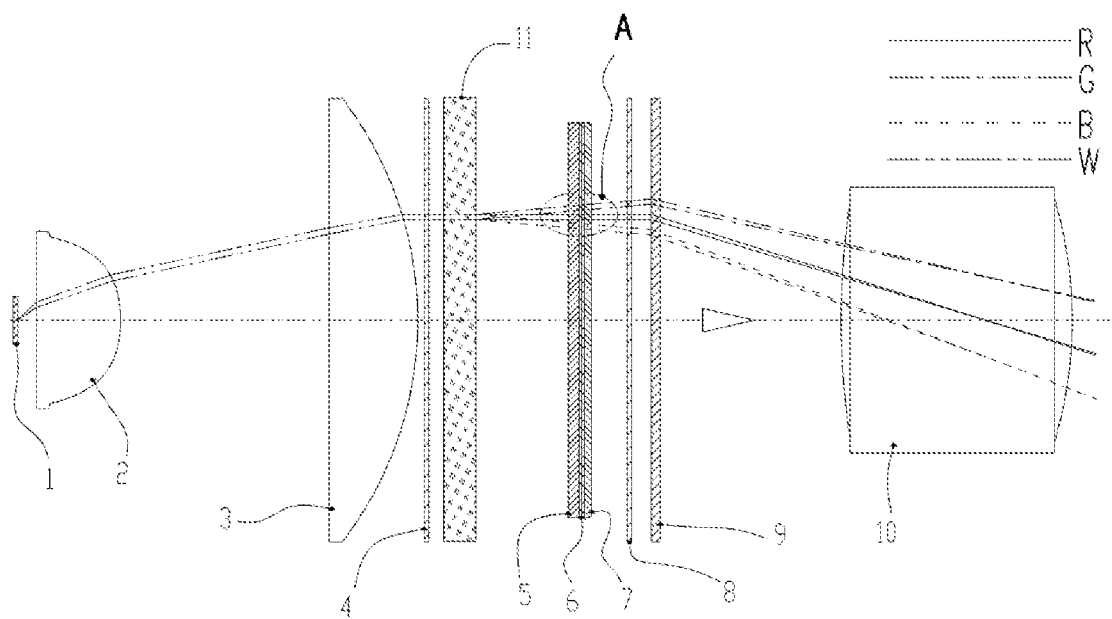
FIG. 4 is a structurally schematic view of the LCD projector with active color separation lighting according to the second preferred embodiment of the present invention.

Referring to FIG. 4, the projection light source 1 is embodied as a white LED light source in the second embodiment of the present invention. The white LED light source comprises 15 wafers each of which having a size of 43 mil. The 15 wafers are closely arranged in 5 rows and 3 columns for forming the white LED light source. The optical extension is still controlled at about 21π, which outputs about 13500 K/3000 Lm of Lambertian light (whose power is about 30 W).

The grating 11 is a volume phase holographic grating. When the white light emitted by the collimating lens 3 passes through the grating 11, since R, G, and B rays of the white light have significant wavelength differences, the grating 11 produces different refractions on the R, G and B light rays, so that the dichroic mirror 5 is able to refract the R, G and B rays with different irradiation angles to irradiate the corresponding R, G, and B sub-pixels of the LCD light valve 6, thereby reducing or avoiding the blocking of light by the CF and the BM of the LCD light valve 6 and improving the transmission efficiency of the LCD light valve 6.

If the grating 11 is to obtain higher efficiency, parameters of the projection light source 1, the condenser 2 and the collimating lens 3 need to be strictly matched with those of the grating 11, and finally matched with the dichroic mirror 5 and the LCD light valve 6. The color combination mirror 7 is matched with the projection lens 10 and the dichroic mirror 5 to maximize the optical system efficiency.

The description of the condenser 2, the collimating lens 3, the incident polarizer 4, the dichroic mirror 5, the LCD light valve 6, the color combination mirror 7, the outgoing polarizer 8, the field lens 9 and the projection lens 10 are able to be found in the first embodiment of the present invention. The luminous flux finally outputted by the LCD projector according to the second embodiment of the present invention is up to 250 Lm, which is impossible with the existing technology (generally, the luminous flux outputted by projectors of the existing technology ≤100 Lm).

Third Embodiment

Figure 5:
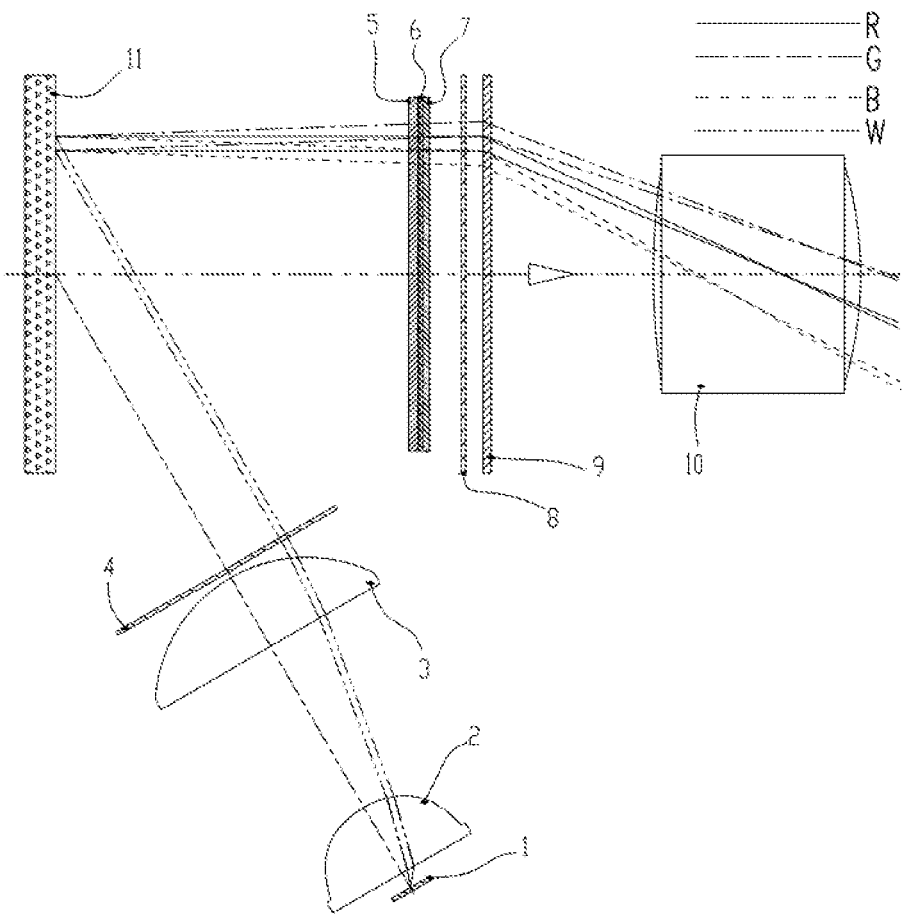
FIG. 5 is a structurally schematic view of the LCD projector with active color separation lighting according to the third preferred embodiment of the present invention.
Figure 6:
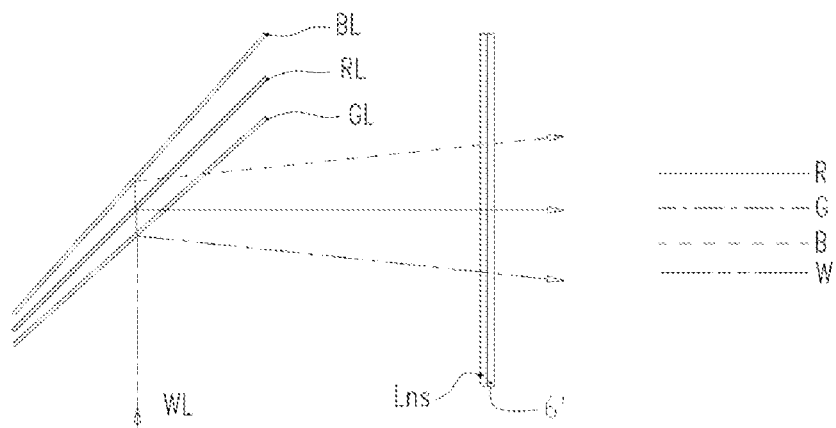
FIG. 6 is a principle diagram of the prior art.
Figure 7:
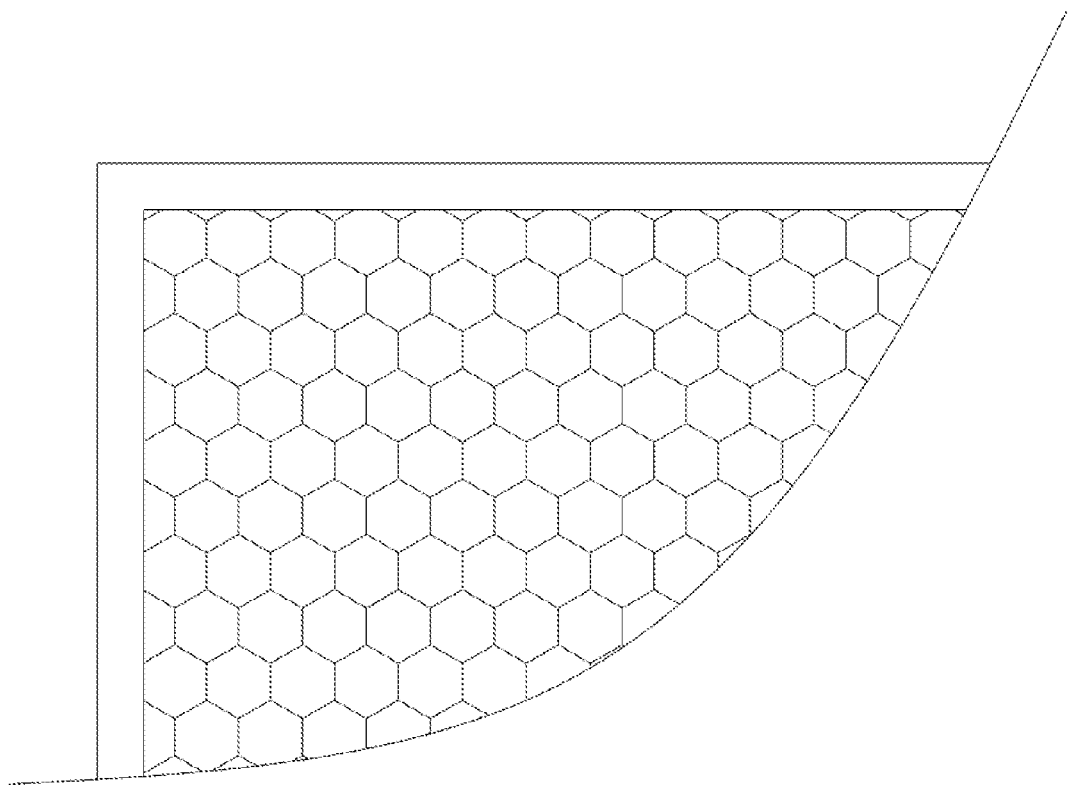
FIG. 7 is a schematic view of a hexagonal lens array (Lns) in FIG. 6.

As shown in FIG. 5, the grating 11 is embodied as a blazed grating, other components, such as the projection light source 1, the Fno of illuminating ray, the dichroic mirror 5, the LCD light valve 6, the color combination mirror 7 and the projection lens 10 are as described in the second embodiment. The luminous flux finally outputted by the LCD projector according to the third embodiment of the present invention is up to 270 Lm, and the power of the projection light source 1 is only 30 watts, which has a very obvious positive significance for the heat dissipation, noise, durability, cost, etc. of the projector.

It should be noted that in this specification, the terms "comprise", "include" or any other variants thereof are intended to cover non-exclusive inclusions, so that a process, method, article or device including a series of elements not only includes those elements, but also includes other elements that are not explicitly listed, or includes elements inherent to this process, method, article, or device.

Specific embodiments are used in this specification to illustrate the principle and implementation of the present invention. The description of the above embodiments is only used to help understand the method and core idea of the present invention. The above embodiments are only the preferred embodiments of the present invention. It should be pointed out that the textual expression is limited, while specific structures are objectively infinite. Therefore, for those skilled in the art, without departing from the principle of the present invention, several improvements, modifications or changes can be made, or the above technical features can be combined in an appropriate manner; these improvements, modifications or combinations, or the direct applications of the inventive concept and technical scheme to other occasions without improvement, shall be regarded as the protection scope of the present invention.

What is claimed is:

1. A liquid crystal display (LCD) projector with active color separation lighting, the LCD projector comprising a projection light source (1), a condenser (2), a collimating lens (3), an incident polarizer (4), a dichroic mirror (5), an LCD light valve (6), a color combination mirror (7), an outgoing polarizer (8), a field lens (9) and a projection lens (10) all of which are distributed in sequence according to a direction of light travel, wherein:

the LCD light valve (6), having a full-color transmissive structure, comprises an incident glass (61), a liquid crystal layer (62) and an outgoing glass (63); a color filter (CF) (611) and a black matrix (BM) (612) are provided on the incident glass (61), multiple thin film transistors (TFTs) (631) are provided on the outgoing glass (63); the CF (611) comprises a red color filter array comprising multiple red-color (R-color) resistors (6112), a green color filter array comprising multiple green-color (G-color) resistors (6111) and a blue color filter array comprising multiple blue-color (B-color) resistors (6113); the R-color resistors (6112) are located between the G-color resistors (6111) and the B-color resistors (6113); the red color filter array, the green color filter array and the blue color filter array of the CF (611), a light transmission window array of the BM (612), and light transmission window arrays of R, G and B pixels of the TFTs (631) are corresponding to each other; a perpendicular bisector of a set of parallel edges of a light transmission surface of the LCD light valve (6) is defined as x-axis, a perpendicular bisector of another set of parallel edges of the light transmission surface of the LCD light valve (6) is defined as y-axis, an intersection of the x-axis and the y-axis is an optical center of the LCD light valve (6), an optical axis passing through the optical center and perpendicular to an xy plane is defined as z-axis.

2. The LCD projector according to claim 1, wherein the projection light source (1) is a three-base color light emitting diode (LED) light source which comprises a R-chipset (102), a G-chipset (103) and a B-chipset (101); each of the R-chipset (102), the G-chipset (103) and the B-chipset (101) comprises one or more columns of chips;

the G-chipset (103) and the B-chipset (101) are provided at two sides of the R-chipset (102) of the projection light source (1), respectively;

the projection light source (1) and the LCD light valve (6) have a same xyz coordinate system and a coincident z-axis; looking from looking from an outgoing surface of the collimating lens (3) to the projection light source (1), an order of the G-chipset (103), the R-chipset (102) and the B-chipset (101) is opposite to an order of the G-color resistors (6111), the R-color resistors (6112) and the B-color resistors (6113) of the LCD light valve (6).

3. The LCD projector according to claim 1, wherein the projection light source (1) is a white LED light source or laser-mixed white light source, the LCD projector further comprises a grating (11) provided between the incident polarizer (4) and the dichroic mirror (5).

4. The LCD projector according to claim 1, wherein:

the dichroic mirror (5) is a cylindrical lens array group which comprises multiple sub-cylindrical lenses; a quantity of the sub-cylindrical lenses in the cylindrical lens array group is equal to the column number of the pixels in the LCD light valve (6), and pixels per column of the LCD light valve (6) are corresponding to a column of the sub-cylindrical lenses, respectively; a central axis of each column of the sub-cylindrical lenses is corresponding to a central line of a light transmission window of each column of the black matrix (612) corresponding to the R-color resistors (6112); the cylindrical lens array group is attached to an incident surface of the LCD light valve (6); each column of the sub-cylindrical lenses are single-sided sub-cylindrical lenses or double-sided sub-cylindrical lenses;

or the dichroic mirror (5) is a lens array which comprises multiple sub-lenses, a quantity of rows and columns of the lens array are respectively equal to a quantity of rows and columns of the pixels of the LCD light valve (6); a center of each of the sub-lenses of the lens array is corresponding to a center of each light transmission window of the black matrix (612) corresponding to each of the R-color resistors (6112); the lens array is attached to the incident surface of the LCD light valve (6).

5. The LCD projector according to claim 1, wherein:

the color combination mirror (7) is a cylindrical lens array group which comprises multiple sub-cylindrical lenses; a quantity of the sub-cylindrical lenses in the cylindrical lens array group is equal to a column number of the pixels in the LCD light valve (6), and pixels per column of the LCD light valve (6) are corresponding to a column of the sub-cylindrical lenses, respectively; a central axis of each column of the sub-cylindrical lenses is corresponding to a central line of a light transmission window of each column of the black matrix (612) corresponding to R-color resistors (6112); the cylindrical lens array group is attached to an outgoing surface of the LCD light valve (6); each column of the sub-cylindrical lenses are single-sided sub-cylindrical lenses or double-sided sub-cylindrical lenses;

or the color combination mirror (7) is a lens array which comprises multiple sub-lenses, a quantity of rows and columns of the lens array are respectively equal to a quantity of rows and columns of the pixels of the LCD light valve (6); a center of each of the sub-lenses of the lens array is corresponding to a center of each light transmission window of the black matrix (612) corresponding to each of the R-color resistors (6112); the lens array is attached to the outgoing surface of the LCD light valve (6).

6. The LCD projector according to claim 1, wherein the condenser (2) is any one of a single lens with freeform surface, a lens combination, a square cone condenser or a CPC (compound parabolic) condenser.

7. The LCD projector according to claim 1, wherein the collimating lens (3) is any one of Fresnel lens, plano-convex lens, biconvex lens and meniscus lens, or any combination of Fresnel lens, plano-convex lens, biconvex lens and meniscus lens.

8. The LCD projector according to claim 3, wherein the grating is a blazed grating or volume grating.

* * * * *